June 17, 1969  H. DAUBER  3,450,479
DIRECTION FINDING APPARATUS
Filed Jan. 26, 1956  Sheet 2 of 2
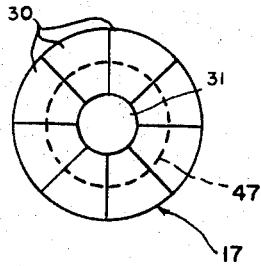
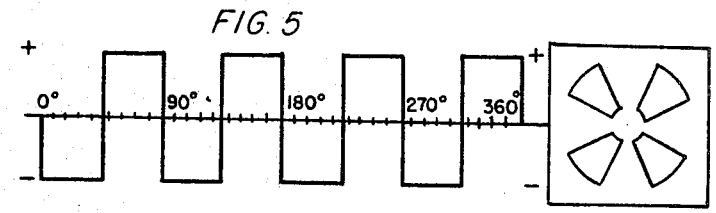
FIG. 5
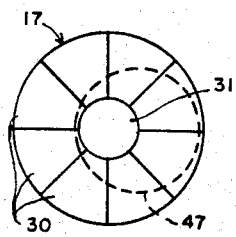
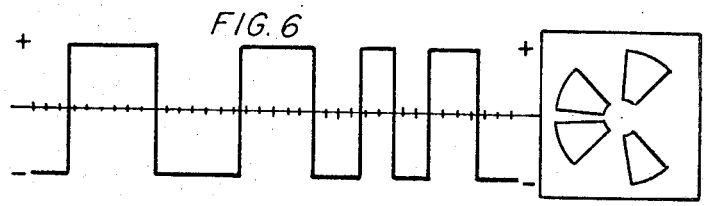
FIG. 6
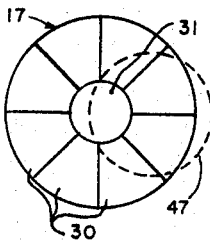
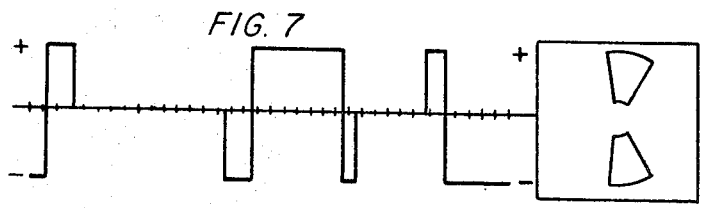
FIG. 7
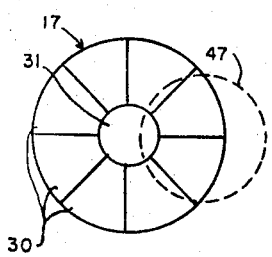
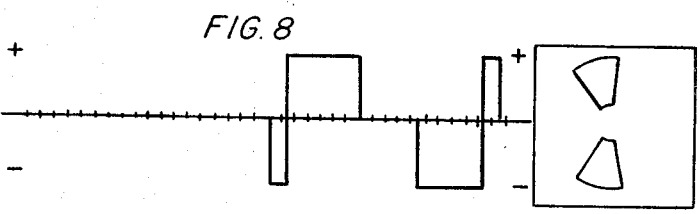
FIG. 8
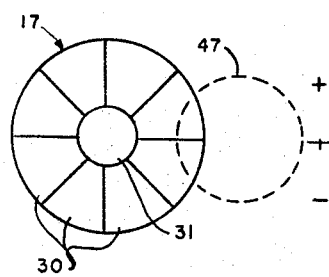
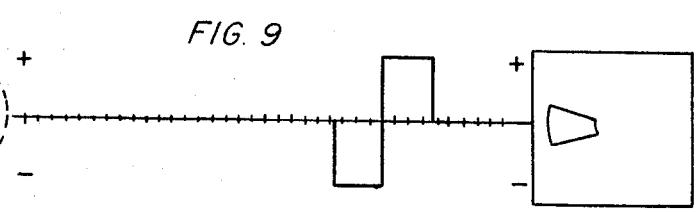
FIG. 9
INVENTOR
HARRY DAUBER.
BY Harry M. Saragovitz
ATTORNEY.

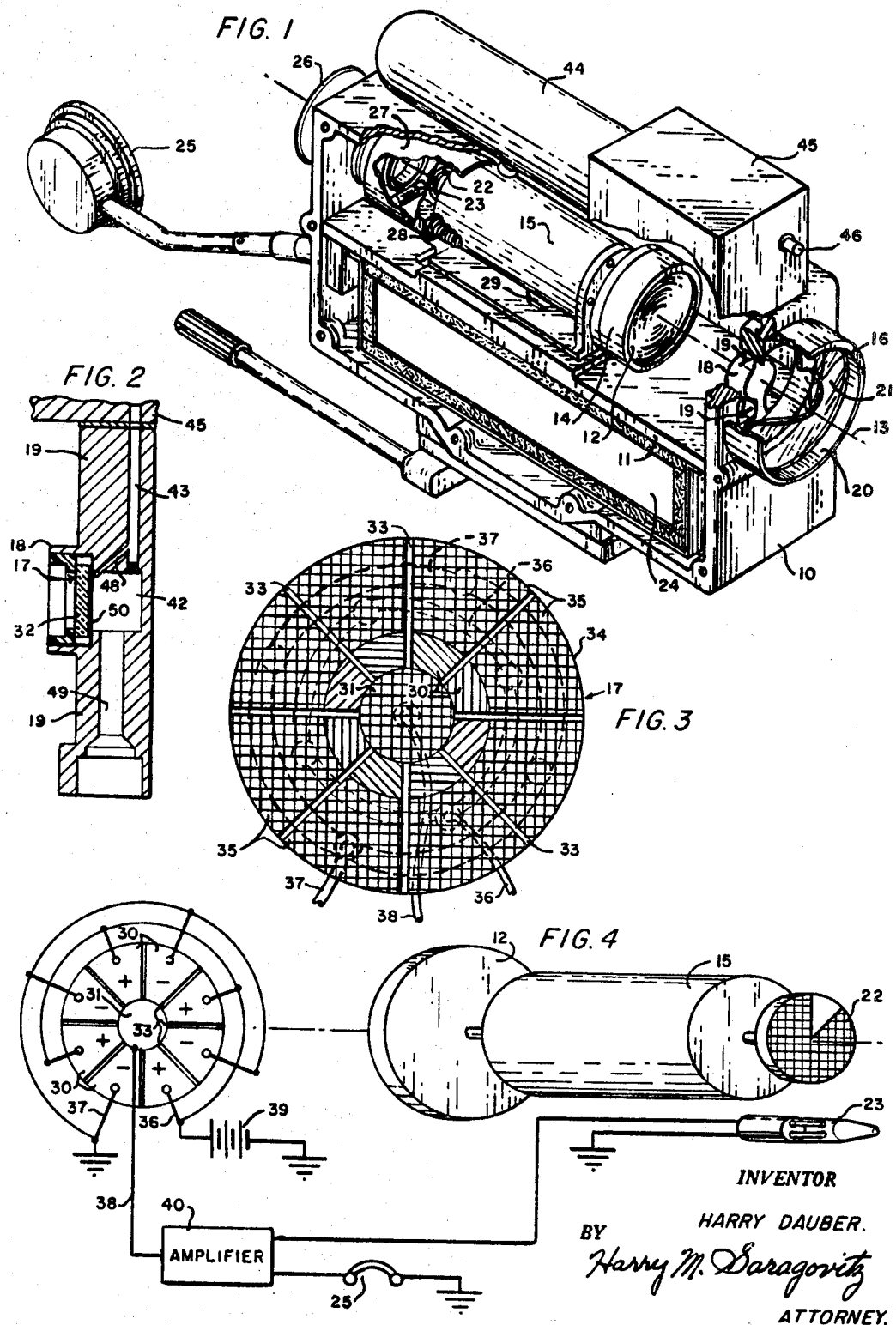

United States Patent Office 3,450,479
Patented June 17, 1969

---

3,450,479
DIRECTION FINDING APPARATUS
Harry Dauber, Asbury Park, N.J., assignor to the United States of America as represented by the Secretary of the Army
Filed Jan. 26, 1956, Ser. No. 561,965
Int. Cl. G01b *11/26;* G01c *1/00;* G01j *1/20*
U.S. Cl. 356—141                                7 Claims This invention relates to apparatus for sensing and accurately locating a source of radiation. It is particularly adapted to the accurate direction finding of an infrared source.

The invention fulfills a need for a compact, lightweight device having high sensitivity and accuracy. These desirable qualities are achieved in an apparatus which consumes only a small amount of power and can be operated by lightweight, compact power sources such as batteries. An important feature of the apparatus relates to the use of a parabolic mirror which functions both as a light gathering element and a scanning device. Such a mirror posesses relatively great radiant energy gathering power and is itself relatively light in weight. The quality of lightness permits the mirror to be rotated at a relatively high scanning speed. By rotating the mirror in a slightly off-axis manner its reflected image can be made to traverse a circular path. It should be noted that the term "scanning" as used herein is intended in all instances to indicate the act of traversing the image in a circular path.

The invention utilizes the scanned image to excite a plurality of sensitive cell elements so arranged with respect to the main direction finding axis of the apparatus that a uniform series of pulses are generated when the device is oriented exactly in the direction of a source of radiation. When the direction finding axis is not oriented directly upon the source a non-uniform train of pulses is generated. The characteristic timing of the signal thus generated may be interpreted to indicate the direction and degree of the off-axis position of the instrument.

Various means for interpreting the signals may be employed. In the form of the invention to be described the signals are amplified and fed to a small discharge lamp the light from which illuminates a stroboscopic disc rotating at the speed of the scanning mirror. The signal produces intelligible patterns upon the disc which indicate the extent and direction of deviation of the direction finding axis of the device from the direction of the energy source. By correctly interpreting these patterns an operator may correct the errors of direction until the device is accurately oriented. An audio detecting means is also employed which receives signals from the sensitive cell. These signals possess identifying qualities which also indicate when the device is accurately pointed in the direction of the source.

It is a primary object of the invention to provide a radiant energy sensitive direction finder of high sensitivity and accuracy.

A further object of the invention is to provide a direction finder which is sensitive to infra-red radiation but does not require a conventional image converting means.

A further object of the invention is to provide an apparatus which is very light in weight and may be operated from lightweight power supply units.

A further object of the invention is to provide an apparatus of the character indicated containing a novel form of radiation sensitive cell capable of producing a modulated signal which when properly interpreted supplies direction finding data for use in orienting the device in the direction of the energy source.

A still further object of the invention is to provide a direction finding device having high sensitivity wherein the activating radiation is picked up by a mirror type lens having high energy collecting power.

Other objects and features of the invention will more fully appear from the following description and will be particularly pointed out in the claims.

To provide a better understanding of the invention, a particular embodiment thereof will be described and illustrated in the accompanying drawing in which FIG. 1 is a perspective view of a preferred embodiment of the invention with parts broken away to better illustrate the assembled mechanism.

FIG. 2 is a detail view of the holding device for the radiant energy sensitive cell which functions to detect energy picked up by the optical system of the device.

FIG. 3 is an enlarged detailed illustration of the sensitive cell.

FIG. 4 is a diagrammatic illustration of the elements of the apparatus and the electrical connections therebetween.

FIGS. 5–9 illustrate typical stroboscopic patterns used as guides in determining degree and direction of movement required to obtain accurate orientation of the apparatus.

The embodiment of the invention illustrated is enclosed in a suitable lightweight housing 10 having a partition 11 therein which divides the space within the housing into upper and lower chambers. One side wall of the housing is removable to provide access to the contained units. The housing, desirably, is provided with means for mounting it upon a tilting and swiveling support which in turn may be mounted upon a tripod or other rigid mounting device.

The optical system of the apparatus is situated in the upper chamber and comprises a parabolic mirror 12 having substantial radiant energy gathering power. The optical axis of the mirror in one form of the device is displaced at a slight angle from the axis upon which it is rotated. The degree of its off-axis position is determined by the focal length of the mirror and the desired size of the circle of scan. However, the mirror may be disposed and rotated in any desired manner to provide for scanning the image of a radiant energy source in the desired path. It is within the scope of the present invention to obtain the required scanning action from the mirror in any suitable manner.

A construction which lends itself to the mechanical requirements and which reduces optical abberations to a minimum is to select a circular portion of a parabolized surface offset from the central area of the parabola. This off-center section of the parabola is then used as the scanning mirror. In mounting the mirror thus obtained the optical axis of the section of the parabola chosen is held parallel to the rotational axis. In this construction the mounting distance from the center of the section chosen to the axis of the parabola is equal to the radius of the scanning circle desired. In mounting the mirror for rotation its own center is mounted upon the rotational axis. Thus, as the mirror is rotated, the image of an energy source is scanned in a circle of the desired diameter. In the preferred embodiment the rotational axis is made to coincide with the main direction finding axis 13 of the apparatus although other arrangements may be made within the scope of the invention.

To facilitate the mounting and to protect the mirror, it is desirably firmly set within a metal retaining ring 14. Power to rotate the mirror may be supplied in any suitable manner such as by an electric motor 15 having the correct speed characteristics. The motor is secured to the partition 11 with its shaft upon the axis 13. The ring containing the mirror 12 may then be mounted directly upon the motor shaft. The motor and its mirror are so positioned within the casing 10 that the focal point of the mirror will lie substantially in the plane of one of the end walls thereof. This end wall of the housing is provided with an aperture 16 at least as large as the diameter of the mirror and having its center upon the axis 13.

A sensitive cell 17 of special construction, to be described in detail hereinafter, is mounted at the center of the aperture 16 upon the axis 13 and is supported therein by a special housing 18 having a pair of narrow leg portions 19 extending to the periphery of the opening. These legs may be sufficiently narrow so that they will cut off only a minimum of the radiant energy reaching the mirror 12 through the aperture 16. Desirably, the aperture 16 is provided with a hood 20 extending outwardly from the casing and in which may be received a radiant energy filter 21. This filter is chosen to select any desired portion of the energy spectrum.

The cell 17 is composed of a plurality of individual elements arranged in a circular pattern. The circle of scan from the mirror and the size of the area occupied by the cell elements are so chosen that the scanned beam of energy will strike all the cell elements uniformly and successively when the device is oriented toward a radiating source. The scanning operation generates a series of pulses within the cell elements which are conducted to devices which produce visual and audio patterns which are capable of interpretation in terms of direction and serve to guide the operator in aiming the device. Two separate interpreting systems are provided. One such means is stroboscopic and the other produces an audio signal in a sound detecting means such as a head phone.

To provide the necessary stroboscopic phenomena the visual element must be driven at the same speed as or at an invariable relative speed with respect to the scanning means. The stroboscopic element may be driven in any manner. A desirable and simplified means for doing this is to mount a stroboscopic disc 22 upon the shaft of the motor 15, desirably, upon its end opposite to that bearing the mirror 12. The disc 22 is provided with a single light reflecting sector occupying about 45° of the area of the disc, the remaining area being non-reflecting. The disc receives the flashing illumination from a neon or other gas type lamp 23 which is energized by the amplified output of the cell 17. The nature of the pattern observed on the disc and its interpretation will be described in connection with the description of the operation of the apparatus.

The signal amplifier is housed in a soundproof container 24 situated in the lower chamber of the main housing 10. The audio monitor is in the form of a head phone 25, desirably, but not necessarily attached to the housing 10 in position adjacent the operator's ear while he is observing the pattern on the disc 22 thru an eyepiece 26 extending thru the wall of the casing 10 opposite to the front wall containing the opening 16. The eyepiece is situated in position to directly observe the disc 22. Desirably, a light shield 27 extends from the eyepiece forward to the motor 15 to exclude extraneous light from the disc 22. The neon lamp 23 is located to one side of a small tubular extension of the eyepiece 26 and is situated in position to throw its light upon the disc and not directly into the eyepiece.

To provide accurate focusing of the image formed by the mirror 12 upon the cell, the motor is mounted for movement along the axis 13 and is guided by a pair of ways, one of which is shown in FIG. 1. The adjustment of the mirror toward and from the cell is accomplished by any suitable means such as a screw type adjustment 28 having a compression spring acting to hold the moving element against a flange on the screw. When correct focus is found a lock screw 29 holds the motor firmly in adjustment. The motor is designed to be operated from a battery power source to promote portability of the apparatus. The motor may, however, be powered in any suitable manner.

The cell 17 illustrated in FIGS. 2 and 3 is composed of a plurality of individual lead sulfide cells 30 arranged radially outward from a central area 31 located upon the axis 13. The elements of the cell are supported on a suitable non-conducting material such as a disc of glass 32 which has been found to function successfully in this capacity. The cell elements are coated directly upon the glass. The number of cell elements is arbitrary but it has been found that eight such cells arranged symmetrically about the central area 31 function efficiently in the apparatus herein described. The inner ends of the cell units are all electrically connected to the center area 31 which is electrically conducting. Each cell is insulated along its radial dimension by narrow spaces 33 between adjacent cell units having no coating thereon. A zone of conducting material 34 surrounds the circle of cells and is divided into individual contact areas 35 insulated from each other by a radial extension of the spaces 33. Each of the areas 35 is electrically connected to the outer ends of the cell elements 30.

The conducting areas 31 and 35 may be of any suitable material. It has been found that a thin layer of gold deposited upon the glass provides efficient and long lasting terminals for the cell elements. The cell elements are formed by depositing a layer of lead sulfide or other radiant energy sensitive material on the glass by well known techniques. To provide operating circuits for the cell, a wire 36 is soldered to every other one of the areas 35, a second wire 32 is soldered to the intermediate areas 35, and a third wire 38 is soldered to the central area 31. In FIG. 3 of the drawings the wires are shown in dotted lines to avoid interfering with a proper showing of the elements of the cell. The dotted circles represent the solder connection from the wires to the gold layer. The sensitive elements of the cell are thus divided into two groups of four cells each, having leads 36, 37 and 38 for connection to the main circuit of the apparatus. Other material than lead sulfide may be employed as the sensitive medium. Lead sulfide has, however, been found to be satisfactory especially in the infra-red band. These cells decrease their electrical resistance when illuminated and when not illuminated present high resistance.

The electrical circuit for the apparatus is shown in FIG. 2 wherein the lead wire 36 interconnecting one group of the sensitive cell elements is connected to the positive terminal of a battery 39, the wire 37 is connected to ground which is equivalent to the negative terminal of the battery and the central area 31 of the cell is connected to the input of an amplifier 40, the output of which is connected to a neon lamp 23. The amplifier 40 may be of conventional construction having a relatively high gain and is supplied with the necessary power from batteries or other suitable source. The assembled amplifier may be compact in size and be received within the casing 10 as above pointed out.

The cell 17 is relatively small compared to the opening 16 and is received in the holder 18 supported centrally within the aperture by its legs 19. The cell holder is of special construction to provide for the introduction of cooling fluid to the cell. Desirably, the cooling is accomplished by providing a chamber 42 back of the cell 17 into which a coolant such as $CO_2$ is introduced thru a channel 43 drilled radially in one of the legs 19. This channel communicates with the chamber 42 and with a supply of fluid $CO_2$ in a container 44 screwed into a gas-tight connection in a cooling fluid controlling unit 45 on the top of the casing 10 wherein a manual valve 46 controls flow of the gas to a channel connecting with the aperture 43. A minute opening in the fluid line leading to the chamber 42 permits the coolant to expand and absorb heat. The cooled fluid is directed upon cell 17 by a small tube 48. The cell is thus cooled which increases its sensitivity to the energy reaching it from the mirror 12, and, moreover, by cooling the cell 17 more uniform performance is obtained from the cell. The gas after contacting the cell flows out of the chamber 42 thru an aperture 49 in the other leg 19 of the holder 18 and thence to a suitable opening leading to the atmosphere.

Means are also provided for preventing excessive accumulaiton of condensed gas upon the cell since such accumulation interferes with the cooling operation. To prevent such accumulation of condensation, a sheet 50 of very thin aluminum of the order of $\frac{1}{1000}$ of an inch thick is secured to the back face of the glass support 32. The presence of the metal assists in the transfer of heat from the cell to the coolant in a uniform manner and moreover since the gas is directed against the metal foil 50 at an angle, a scrubbing action takes place which assists in preventing the deposit of condensation upon the cell. In the case where $CO_2$ is the coolant solid $CO_2$ tends to accumulate upon the cell but is prevented in the above described manner. The audio sensing means may be a head phone 25 connected to the output of the amplifier 40.

The operation of the cell 17 in connection with the stroboscopic disc 22 is illustrated diagrammitically in FIGS. 5, 6, 7, 8 and 9. With the various circuits energized and the motor running, the mirror 12 traverses a sharply focused relatively small image of the source of radiation in a circle successively activating each of the individual lead sulfide cell elements. In the drawings at the left of each of the figures a diagrammatic illustration of the cell elements is presented together with a dotted circle 47 which represents the path of the image from the mirror. The center portion of each figure illustrates a graph of the voltages generated by the cell elements throughout one revolution of the scanning means. The right hand portion of each figure represents the pattern that appears upon the stroboscopic disc as a result of the successive illumination of the reflecting sector on the disc 22 by successive flashes of the lamp 23.

It is a property of the cell elements that illumination thereof causes a decrease in their electrical resistance. The voltage across the illumiated elements as applied thereto by the battery 39 is reduced while the voltage across unilluminated cell elements remains at a relatively high value. Thus, a series of positive and negative pulses are generated as indicated in the graphs which represent the pulse formations through one complete scanning cycle. For best operation, it is assumed that a full excursion of voltage from plus to minus is required to fire the tube 23.

In FIG. 5, it is assumed that the optical axis 13 of the apparatus is directly in line with the radiant energy source in which case the pulse formations are symmetrical and will produce four symmetrically spaced images of the white sector on the disc 22 as shown at the right of FIG. 5.

In FIG. 6 it is assumed that the radiant energy source is not in line with the axis 13 but is actually slightly to the left of such axis. In this case the image is deflected slightly to the right of the center of the cell. The scanning circle is thus displaced and causes a non-uniform voltage pattern as shown which produces a distorted pattern approximately that illustrated at the left of the figure wherein the sectors to the right of the display separate and those at the left approach each other. To correct the off-axis position of the device, therefore, the operator must learn to orient the device to the right or in counter-clockwise direction to align the device with the source.

If the source of energy is still further off the axis of the instrument so that the scanning circle 47 is in the position shown in FIG. 7 the pattern produced as shown at the right of the figure contains only two images of the sector and these images are slightly displaced to the left. It will be noticed at this time that the image travels through the central area 31 of the cell at which time the two left hand sectors are flashed in such close time sequence that the electrical circuits fail to follow and therefore one of each pair fails to appear on the disc.

In FIG. 8 the orbit of the image is running out of the central area 31 and produces a visual pattern showing only two sectors positioned slightly to the left of the figure.

Finally the orbit in FIG. 9 strikes only a single pair of cell elements and only one segment appears extending to the left. In the latter case, the operator moves the instrument in a direction toward the existing segment to make his correction. Or, in other words, the instrument is rotated on its pivotal support in a counterclockwise direction.

It will thus be seen that the operator by learning the significance of the various patterns may orient the instrument into accurate alignment with the source of energy as indicated in FIG. 5.

Obviously, the interpretation of the synchroscope patterns applies not only for left or right deflections but also for any off-axis position of the source.

It is to be understood that any suitable radiant energy sensitive material may be used for the cell elements 30. It has been found, however, that lead sulfide functions in a satisfactory manner especially in the infra-red portion of the spectrum. The response of the cells to decrease their resistance is favorable and they present a high resistance when receiving no radiant energy.

What is claimed is:

1. Direction finding apparatus comprising an optical system having a major direction finding axis operable to image an area to be surveyed wherein a radiant energy source may be found, a radiant energy sensitive cell at the focus of said optical syntem, said cell having a plurality of independent sensitive elements arranged symmetrically around said direction finding axis, means to scan in a circle the image of an energy source picked up by said optical system thereby to traverse the image of said energy source successively across each of said cell elements, electrical connections between said cells including a source of energy and a pair of output terminals whereby when said axis is directed toward said energy source a uniform pattern of electric signals is generated at said terminals by said cell but when the axis is not directed at said energy source a non-uniform pattern of signals is generated and stroboscopic means for interpreting the signals whereby the signals may be used by the operator to orient said major axis toward the energy source.

2. Direction finding apparatus comprising an optical system for imaging an area to be surveyed, said system having a major direction finding axis, means to scan in a circle the image of a radiant energy source picked up by said optical system, a radiant energy sensitive cell having a plurality of individual elements arranged symmetrically about said major axis at the focus of said optical system so that each cell element is scanned successively by the scanning image, means interconnecting said cell elements to produce a train of electrical pulses which are uniform in size and time duration when an energy source focused by said optiual system is in line with said major axis, the pulses of said pulse train becoming non-uniform in size and time duration when said source lies in a position off of said major axis and visual stroboscopic means operable to interpret the output signals from said cell to enable an operator to distinguish between correct and incorrect orientation of said major axis toward the said energy source.

3. Direction finding apparatus comprising an optical system having a major axis directable toward an area to be surveyed, said optical system including a driven shaft, a light collecting reflection type imaging means secured to said shaft in position to scan its image in a circular path, a stroboscopic disc secured to said shaft, a discharge type lamp illuminating said disc, a radiant energy sensitive cell having a plurality of individual elements disposed symmetrically around said major axis, means connecting the elements of said cell to produce a succession of electric pulses at its output when they are excited by radiant energy, means to amplify said pulses, a connection from the output of said amplifier to said lamp whereby when said major axis is directed toward a source of energy the stroboscopic pattern appearing on said disc will be uniform and symmetrical about its axis and when the energy source lies in a direction off the said major axis a non-uniform stroboscopic pattern is produced thereby producing data useful to an operator in guiding said axis toward the said source of energy.

4. Direction finding apparatus having a major axis directable toward a source of radiant energy comprising a concave scanning mirror having its optical axis offset from and parallel to said major axis, means to rotate said mirror on said major axis so that an image from the mirror will be scanned in a circle, a radiant energy sensitive cell having a plurality of elements arranged symmetrically about said major axis at the focus of said mirror, a stroboscopic disc rotated at a speed proportional to the speed of said scanning mirror, a gas type flash lamp illuminating said disc, an electrical amplifier, connections from said cell elements to said amplifier and from the output of said amplifier to said lamp, said connections being so arranged that the light pattern on the stroboscopic disc will bear a characteristic relation to the alignment or lack of alignment of said major axis with respect to the direction of the energy source.

5. Direction finding apparatus according to claim 4 together with audio receiving means connected to the output of said amplifier.

6. Direction finding apparatus comprising a casing, a motor secured in said casing having its shaft upon the major direction finding axis of the apparatus, a concave optical scanning mirror mounted on said shaft and having its own axis disposed parallel to and offset from said major axis so that an image formed by the mirror will be scanned in a circle, an opening in the wall of said casing at least as large as said mirror in line with said major axis and disposed opposite to the reflecting surface of said mirror, a radiant energy sensitive cell having a plurality of individual elements arranged symmetrically around said major axis at the focal plane of said mirror in position to be successively scanned by the said rotating image, a stroboscopic disc on said motor shaft, a gas discharge type lamp, an amplifier, connections from the elements of said cell to said amplifier, connections from the amplifier output to said lamp and a viewing eyepiece directed upon said stroboscopic disc whereby the pattern observed on the disc may be interpreted in terms useful in orienting the said major axis in line with the energy source.

7. Direction finding apparatus according to claim 6 and wherein one terminal of all the elements of said sensitive cell are connected to a common output terminal and the other treminal of alternate cell elements are connected respectively to positive and negative terminals of a direct current power source.

References Cited

UNITED STATES PATENTS

| | | | |
|---|---|---|---|
| 1,747,664 | 2/1930 | Droitcour | 250—203 X |
| 2,401,712 | 6/1946 | Turrettini | 250—237 X |
| 2,418,137 | 4/1947 | Noel | 250—203 X |
| 2,431,510 | 11/1947 | Salinger | 250—237 X |
| 2,433,700 | 12/1947 | Larson | 250—203 X |
| 2,462,925 | 3/1949 | Varian | 250—203 X |
| 2,422,971 | 6/1947 | Kell et al. | 244—14.3 |
| 2,513,367 | 7/1950 | Scott | 250—203 |

RODNEY D. BENNETT, Jr., *Primary Examiner.*

DANIEL C. KAUFMAN, *Assistant Examiner.*

U.S. Cl. X.R.

250—83.3, 203, 208